US005425823A

United States Patent [19]

Woodside, III

[11] Patent Number: 5,425,823

[45] Date of Patent: Jun. 20, 1995

[54] COMBINATION LABEL PRINTER AND APPLICATION DEVICE

[75] Inventor: James Woodside, III, St. Petersburg, Fla.

[73] Assignee: B.C.E. Technologies, Tampa, Fla.

[21] Appl. No.: 575,217

[22] Filed: Aug. 30, 1990

[51] Int. Cl.[6] .................... B32B 31/00

[52] U.S. Cl. .................... 156/64; 156/277; 156/285; 156/360; 156/384

[58] Field of Search .................... 156/277, 285, 64, 360, 156/361, 362, 384, 387, 542, 566

[56] References Cited

U.S. PATENT DOCUMENTS

| | | | |
|---|---|---|---|
| 4,321,103 | 3/1982 | Lindstrom et al. | 156/351 |
| 4,329,191 | 5/1982 | Barber | 156/64 |
| 4,612,076 | 9/1986 | Moss | 156/249 |
| 4,652,317 | 3/1987 | Seestrom | 156/64 |
| 4,844,629 | 7/1989 | Hoyt | 101/228 X |
| 4,857,121 | 8/1989 | Markley et al. | 156/64 |
| 4,927,486 | 5/1990 | Fattal et al. | 156/351 |

*Primary Examiner*—David A. Simmons
*Assistant Examiner*—J. Sells
*Attorney, Agent, or Firm*—Michael Best & Friedrich

[57] ABSTRACT

A combined label printer and application device is provided for labeling a plurality of individual product units with customized labels. The individual product units are conveyed through a data determining mechanism, such as a checkweigher or electric eye in order to identify data to be imprinted on the label. The information is conveyed to a microprocessor which converts the data into commands for a label printer. The printer in turn prints either alpha-numeric indicia, bar codes or other desired visual indicia on the label. The movement of the individual product units is coordinated with a corresponding label, and the label is applied to the product unit by means of a combined vacuum and air jet head. The individual labels, in a preferred embodiment, are coated with pressure sensitive adhesive, and are fixed on rolls to releasible backing strip. The individual labels are stripped from the backing strip and held temporarily on a vacuum head until the desired product unit is located below the head. Air jets then blow the label onto the product unit with sufficient force to cause adhesion of the label to the product.

2 Claims, 11 Drawing Sheets

COMBINATION LABEL PRINTER AND APPLICATION DEVICE

BACKGROUND OF THE INVENTION

1. Field of the Invention

The present invention relates to labeling equipment in general and in particular to combination label printers and application device.

2. Prior Art

Label applicators typically apply labels to articles as the articles are conveyed past the label applicator. Usually, the labels are releasably adhered, in a single column, to an elongated backing strip. The label applicator removes one of the labels from the backing strip and releasably retains it at a labeling station. As the article to be labeled nears the removed label, it is applied to the article. Label applicators of this type are shown, for example, in U.S. Pat. Nos. 3,093,528, 3,729,362, 4,024,011 and Re. 30,149.

Label applicators of this type, while satisfactory for many applications, can introduce delay into an assembly or packaging operation in which labeling must be carried out. For example, label indexing or advancement; i.e., the removal of a label from a backing strip and applying it to a suitable retaining means, is relatively slow while the transfer of a retained label to the article can be rapidly carried out. Label indexing can be sufficiently slow so that the labeling function is the slowest operation on the production line.

Other work operations also involve the repetitive supply of elements to a work station so that such elements can be affixed, assembled, laminated, etc., to articles being conveyed through the work station. In some of the work operations, the repetitive supply of the elements is the slowest step in the process, and accordingly, this limits the speed with which the articles can be conveyed through the work station. Thus, other work operations involve problems similar to the label application problem described above.

An additional problem in the high speed labeling of articles is to provide labels contain unique information for each individual package, such as weight, product size, a bar code, or a product identification number. The synchronization of a high speed printer with a label applying device which can successfully apply the correct label to the desired product unit has heretofore elluded the efforts of those in the industry.

SUMMARY OF THE INVENTION

Accordingly, it is an object of the present invention to provide a labeling device which can apply pressure sensitive labels at high speed to individual product units on a continuous flow basis.

It is an additional object of the present invention to provide such a device which can print individual labels having unique product identification data and apply them to the correct product unit on a continuous flow basis.

It is a further object of the present invention to provide such a device which is low in cost, easy to operate and easy to repair.

In accordance with these and other objects of the invention, a combination label printer and automatic label applying device is provided for applying the labels to a series of product units. The device includes a conveyor for continuously conveying a series of individual product units. A number of different mechanisms may be utilized for determining data relative to each of the product units. For example, in one embodiment, a check weigher is provided for weighing individual boxes of products. Alternatively, photovoltaic cells may be utilized to measure the length and height of the product. Similarly, a video camera may be utilized to determine the type of product contained within the individual product unit. Again alternatively, a bar code may already be affixed to the product indicating the product type, and a bar code reader may be utilized for accessing this information. This information may then be printed in alpha-numeric form on the label. Again alternatively, the information may be determined by a individual operator visually. A high speed printer is then provided for printing the information onto a series of labels. A microprocessor coordinates the movement of the labels with the movement of the product units, so that the appropriate labels align with each product unit. The labels are then applied to each product unit. In a preferred embodiment, the labels are applied by means of a combination vacuum pad, air jet device. Specifically the pressure sensitive labels are removed from the roll of backing material individually and held momentarily on a vacuum pad. When the appropriate product unit is in position for labeling, an air jet blows the label off the vacuum pad and onto the unit. The force of the air jet causes the adhesive on the back side of the label to adhere to the product unit. A take-away conveyor then removes the product unit from the device.

DETAILED DESCRIPTION OF THE PREFERRED EMBODIMENT

Figure 1:
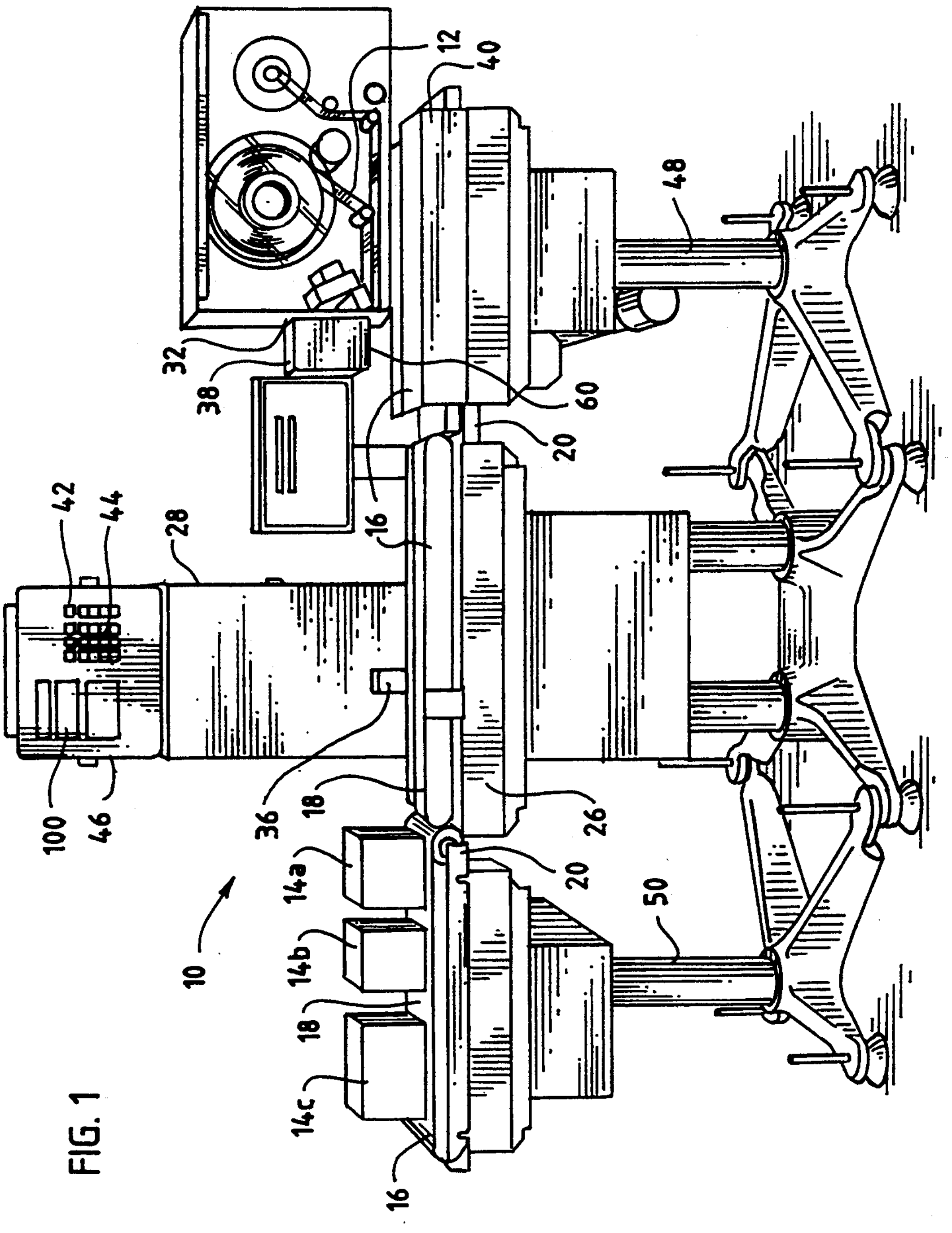
FIG. 1 is a front elevational view of the combination label printer and automatic label applying device of the present invention.

As best shown in FIGS. 1 and 5–8 of the drawings, a combination label printer and automatic label applying device 10 is shown. Device 10 is used for applying labels 12 to a series of individual product units 14*a*, 14*b* and 14*c*. Device 10 includes a conveyor mechanism 16 which includes a conveyor belt 18, rollers 20, a drive mechanism 22 (not shown) and an electric motor 24 (not shown) which drives the drive mechanism 22 which in turn causes the rollers 20 to rotate, thereby advancing conveyor belt 18. The speed of conveyor belt 18 is controlled by the speed of the electric motor 24.

As further seen in FIGS. 1 and 5–8, a mechanism 26 in the form of a check weigher is provided for determining data relative to each product unit 14. In particular, check weigher 26, in a preferred embodiment comprises a strain gauge loadcell having a standard range of 6,000 grams or an optional range of 15,000 grams. Electric motor 24 preferably comprises a standard ¼ horsepower permanent magnet motor with variable speed. The speed of conveyor belt 18, in a preferred embodiment, is 20 to 700 feet per minute. As product units pass over check weigher 26 each individual product unit is weighed and the resulting data is stored in microprocessor 28. The data is conveyed between check weigher 26 and microprocessor 28 by means of conventional electric wiring 30. Microprocessor 28 converts the electrical signals from check weigher 26 into digital form which in turn is conveyed to printer 32 through an RS-232-C interface 34.

In addition to conveying data to printer 32, microprocessor 28 also coordinates movement of the product units 14 with movement of the labels 12, so as to align each product unit 14 with its corresponding label 12. This is accomplished by means of a series of photovoltaic cells 36 which show the position of each product unit as it passes along conveyor 16. As a result, microprocessor 28 can calculate when the product unit 14 has arrived under the label applicator 38. Finally after application of label 12 to the product unit 14, the product unit 14 is carried from the device by take-away conveyor 40.

As further shown in FIGS. 1 and 5–8, a control console 42 is provided for controlling the operation of the device 10. Control console 42 includes an operator key pad 44 and a display 46. In a preferred embodiment, menus on a two line/40 character display 46, provide instructions in English language or abbreviations.

Figure 7:
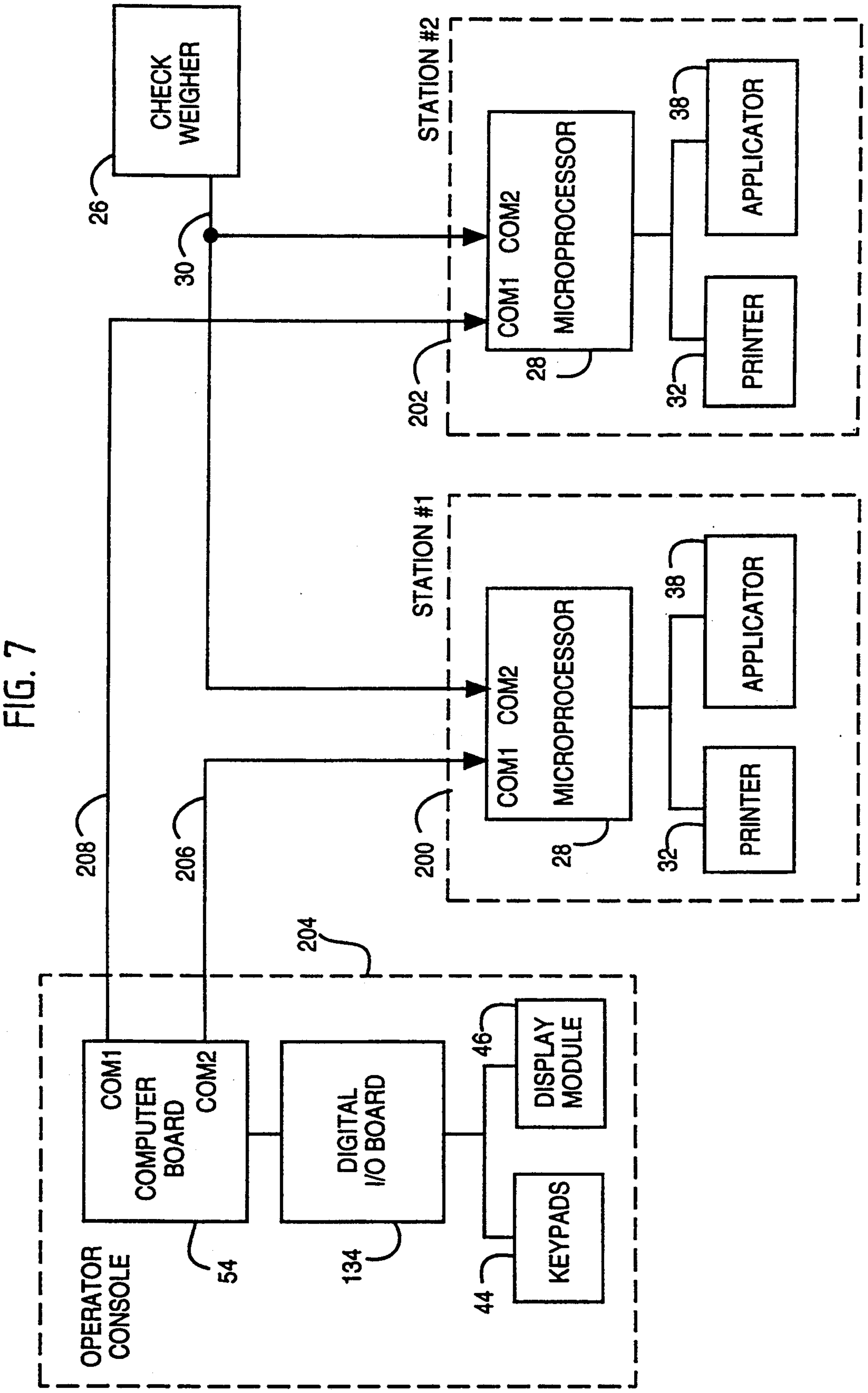
FIGS. 7 and 8 are block diagrams of equipment configurations capable of printing and applying two labels at a time.
Figure 8:
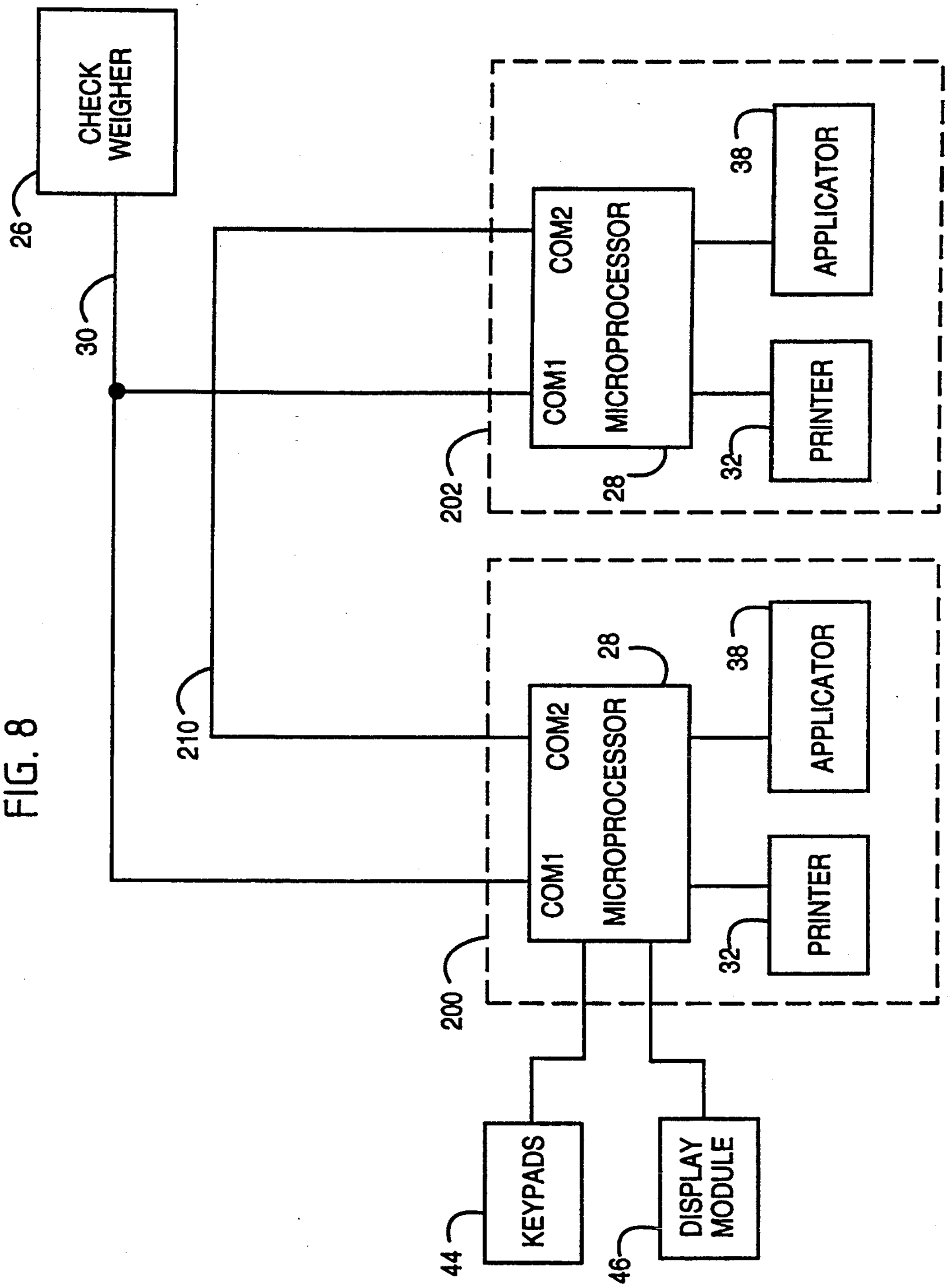

As shown in FIGS. 7 and 8, in the embodiment shown, a pair of printers 32 and label applicators 38 are provided for printing and applying labels two at a time. Thus the line speed in a preferred embodiment is increased to 180 packages per minute. Operation of the printers 32 and label applicators 38 is controlled by microprocessor 28 so as to insure proper alignment of the labels 12 with each individual product unit 14. In a preferred embodiment, product unit 14 is preferably no greater than 12 inches in length, and 17 inches in width. The height of the product unit is flexible depending on product stability. As illustrated in FIG. 1, the height of the product units 14 relative to the printers 32 and labelers 38 can be controlled by hydraulic or electric jacks 48 and 50.

Figure 5:
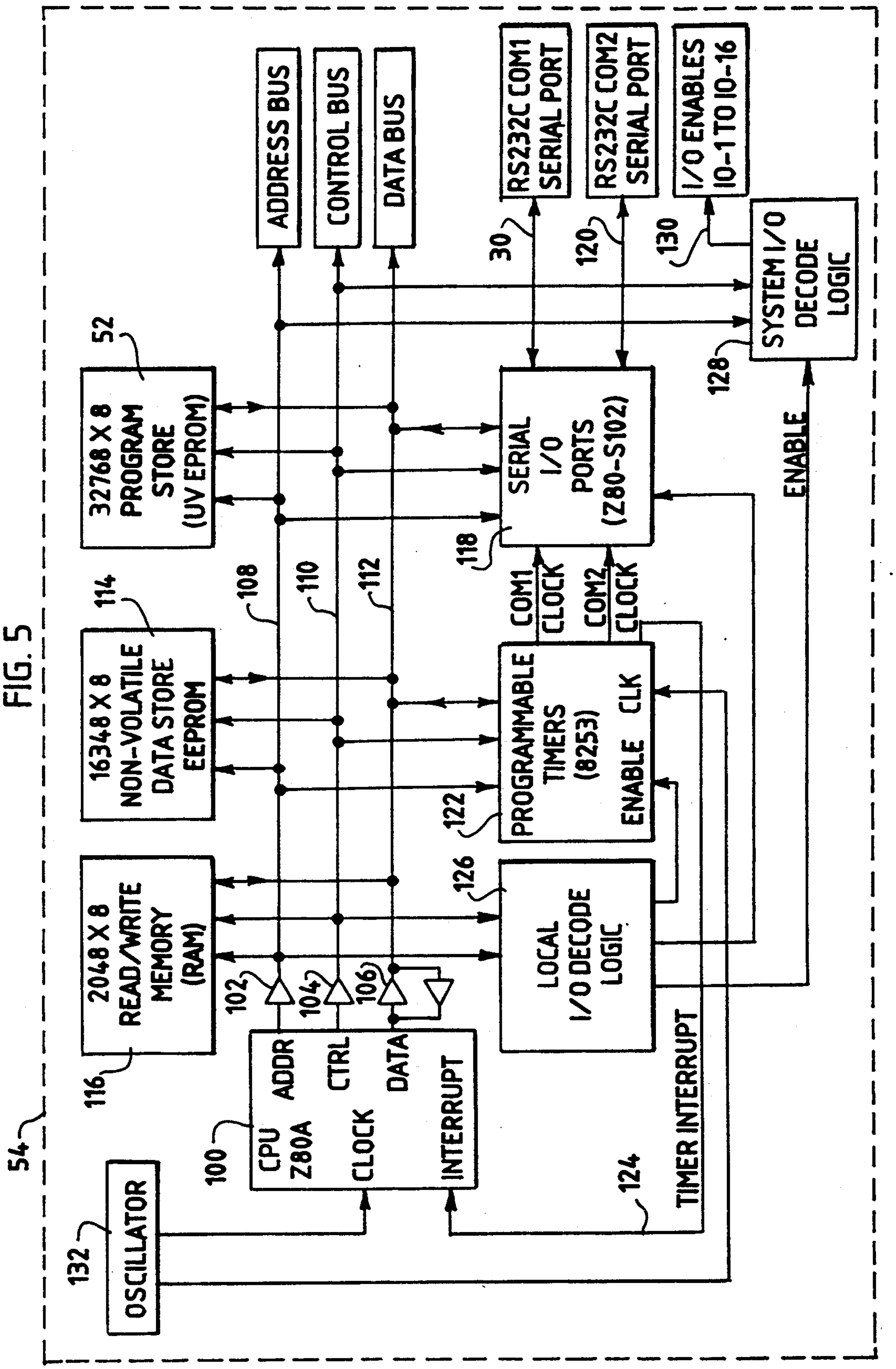
FIG. 5 is a block diagram of the computer board portion of the present invention.
Figures 6, 6A:
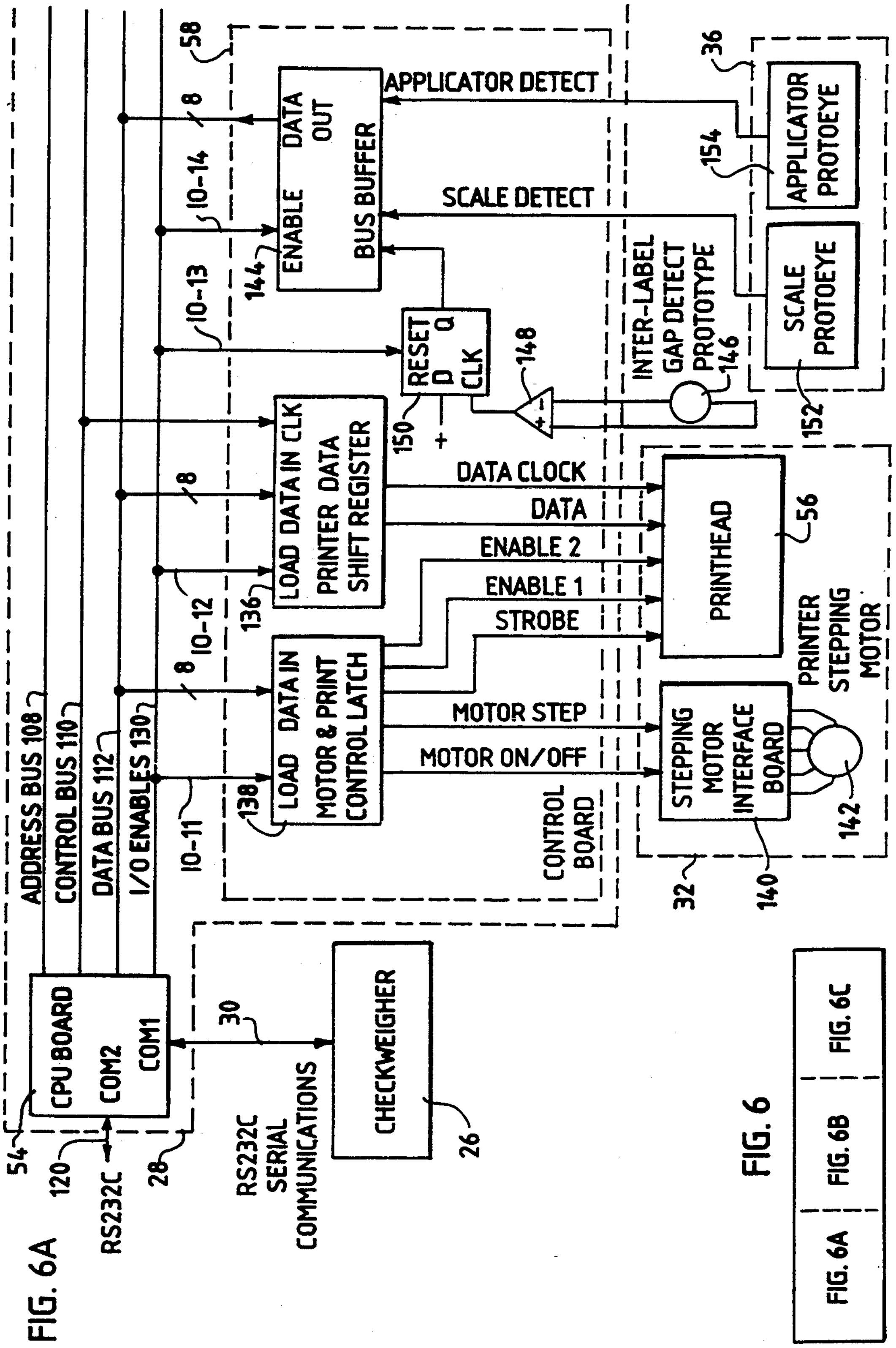
FIG. 6 is a block diagram of the microprocessor portion of the present invention configured for a single printer and applicator station.
Figure 6B:
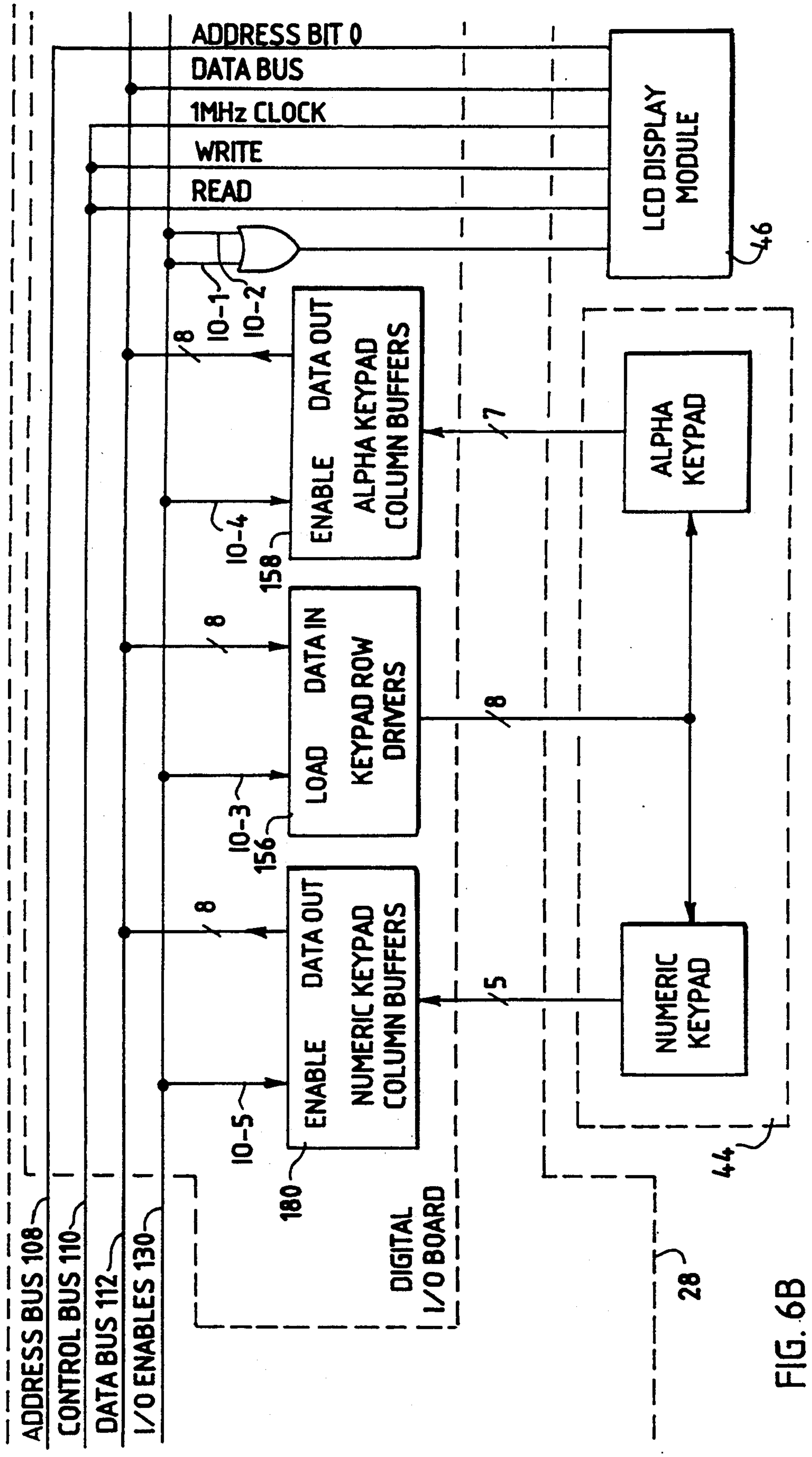
Figure 6C:
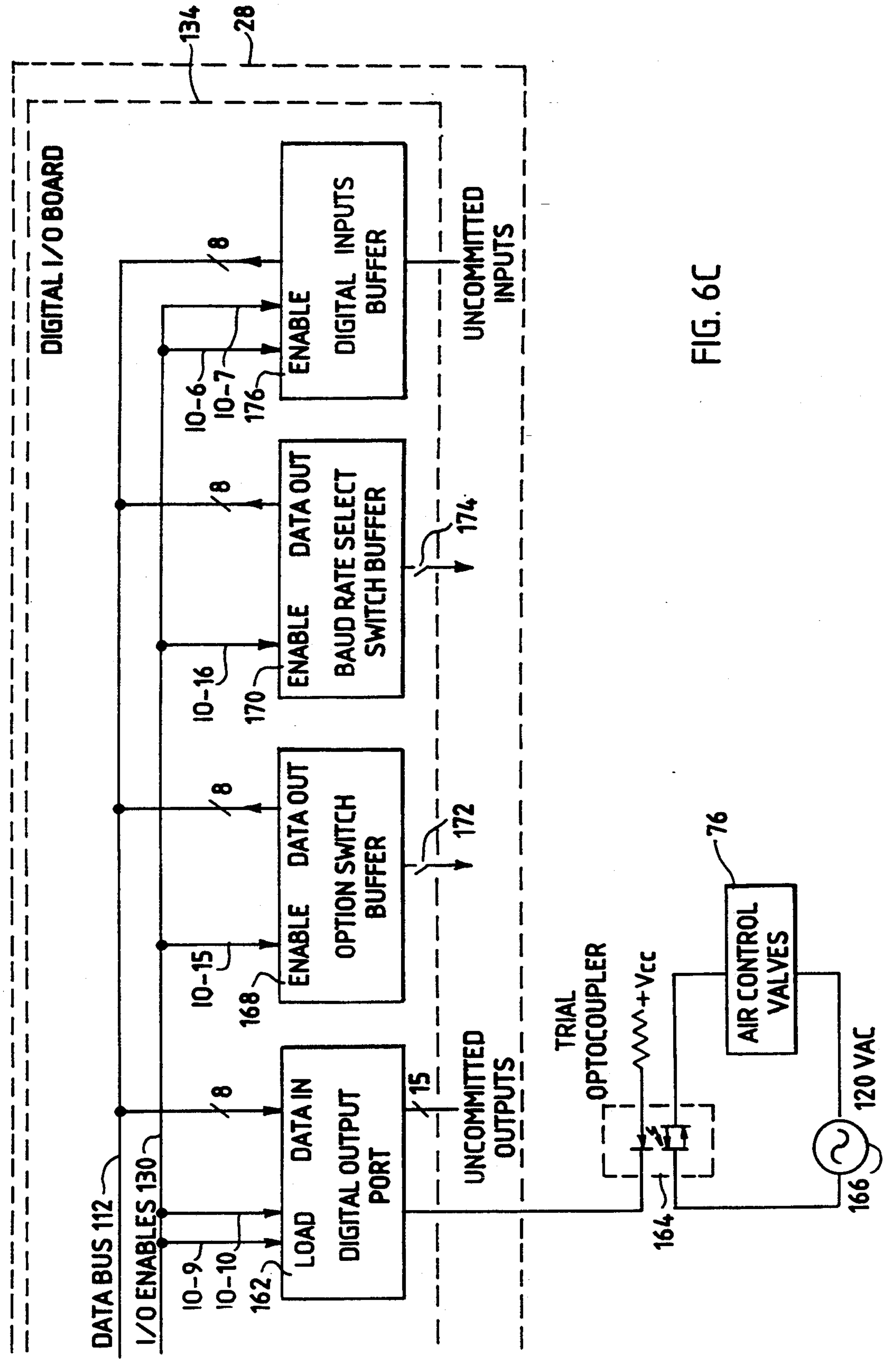

As shown in FIGS. 5 and 6, microprocessor 28 includes a resident E-prom (Erasable Programmable Memory) 52 on the computer board 54. The E-prom 52 has been preprogrammed with a fixed set of imprint fields and is fed a data signal from an interfaced scaling device checkweigher 26. The data signal to the E-Prom 52 on the computer board 54 prompts the computation of "on-demand" human readable and bar code characters, and the computed data is then downloaded on-line and in real time to the thermoprinting head 56 by an interface print head control PC board 58. This data then prompts the advance of the labels 12.

Figure 2B:
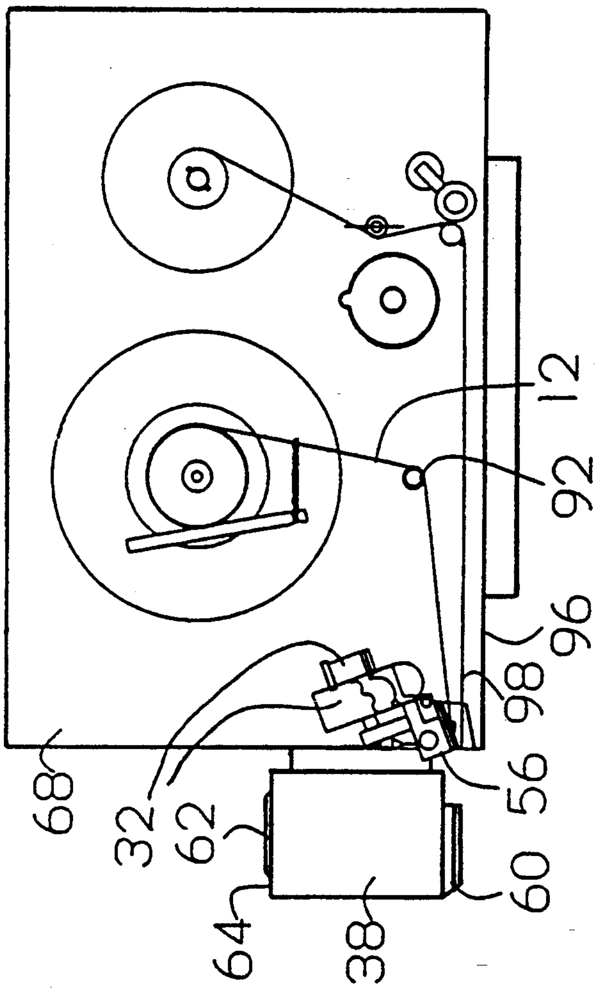
FIG. 2 is a side view of the printer and label applicator portion of the present invention.
Figure 2A:
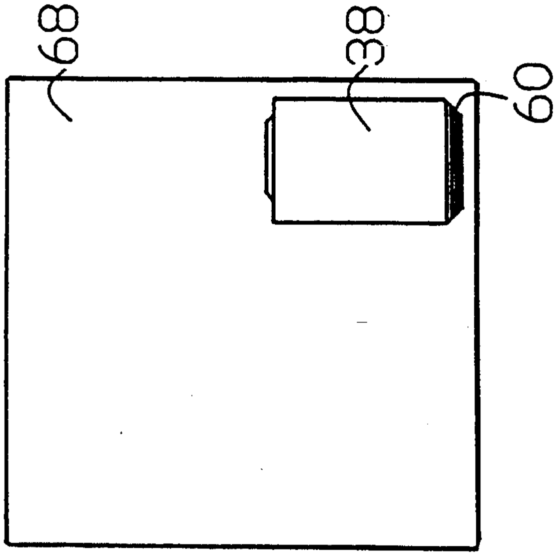
Figure 3:
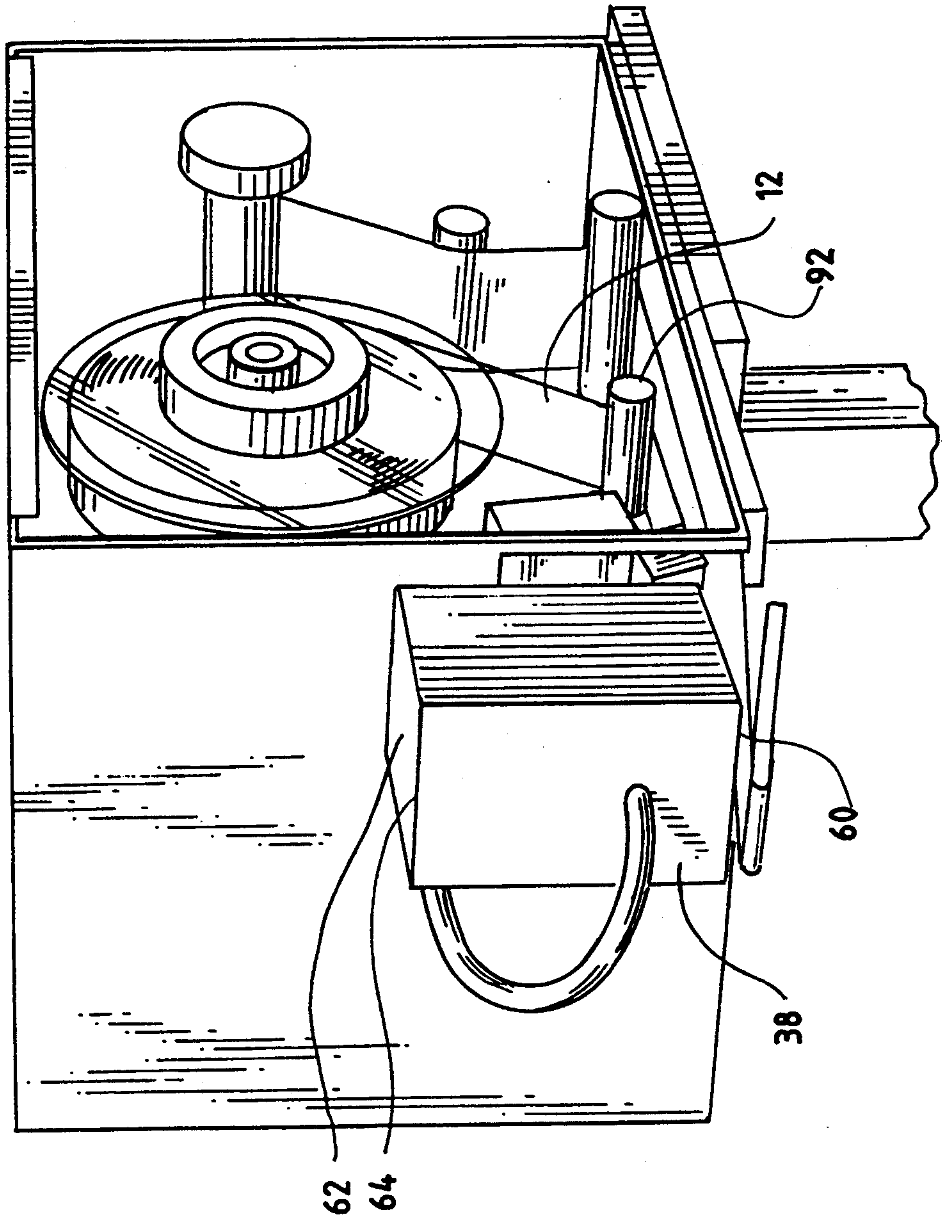
FIG. 3 is a front perspective view of the printer and label applicator portion of the invention.
Figure 4:
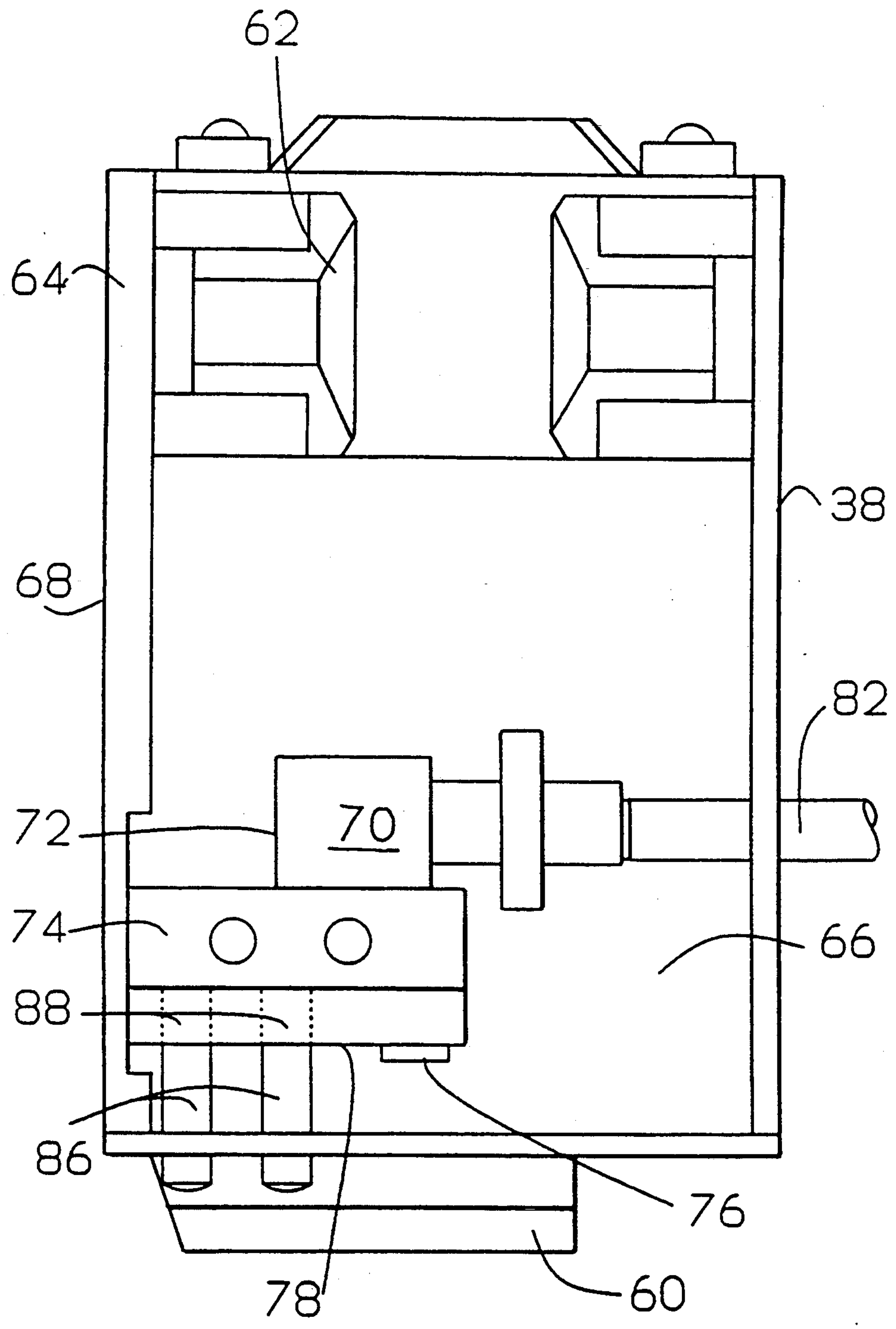
FIG. 4 is a sectional view of the applicator portion of the present invention.
Figure 9:
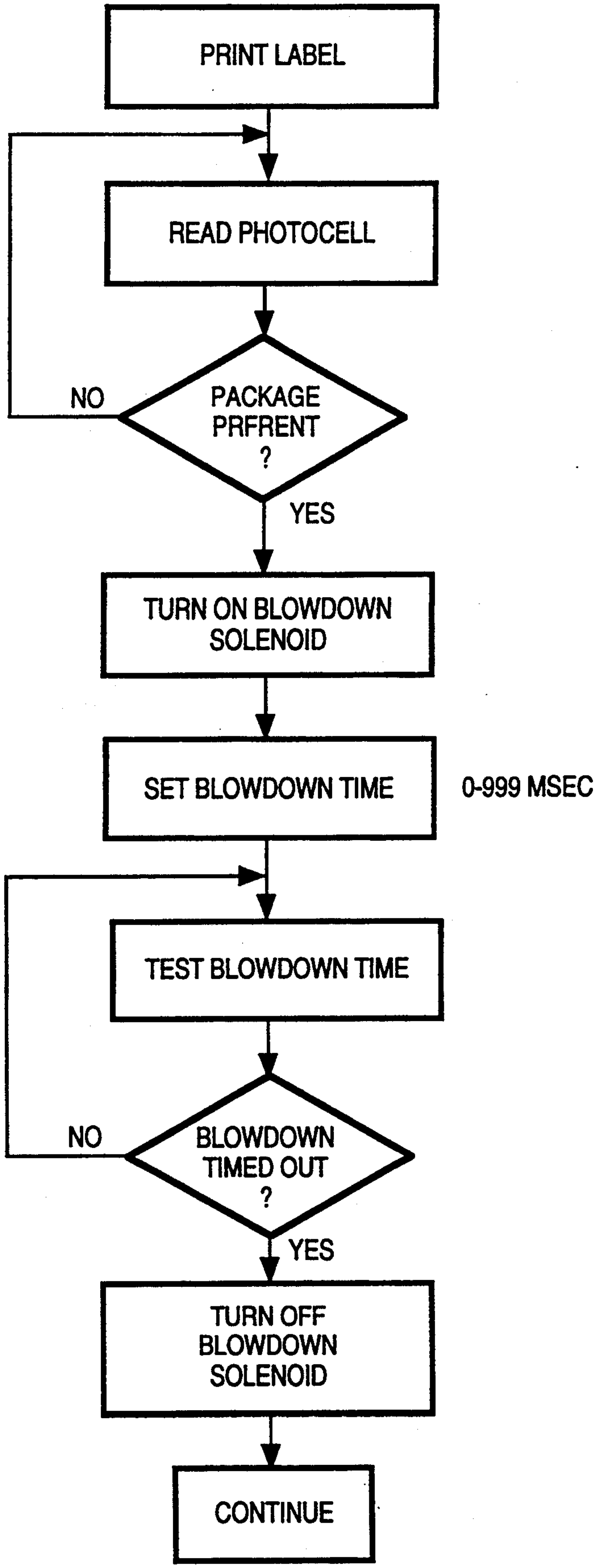
FIG. 9 is a flow chart showing the logic utilized in controlling application of labels to products as they pass along the device of the present invention.

As illustrated in FIGS. 2 and 4, single label 12 is moved out of the print head 56 and directly onto the applicator plate 60. The label 12 is held in place by a constant vacuum pulled via a small fan motor 62, mounted in the top 64 of the applicator assembly 38. Mounted inside the lower portion 66 of the applicator housing 68 is a small manifold 70. This manifold 70 is square in design and has two primary holding chambers 72 and 74 for in feed compressed air. Thirty to forty pounds per square inch of compressed air are constantly fed into the manifold 70. The pressure within the manifold 70 is regulated by a series of air valves 76 located on the main base plate 78 of the applicator 38. The air valves 76 adjust the air in flow for various functions. Compressed air is held in these manifold chambers 72 and 74 and released upon an electronic signal from a photoelectric or eye sensor 36 located on the conveyor line 16, which is tripped by the product unit 14 as it travels down the conveyor 16. The photoelectric eye's electronic signal then prompts the air valve regulator 80 (not shown) to force more regulated air into the manifold 72 via the in feed air line 82. As more regulated compressed air is forced into the manifold chambers 72 and 74, the compressed air already stored in the manifolds air chambers are forced out. Plastic air jet nozzles 86 are screwed into drilled and tapped holes 88 strategically placed in the base of the manifold 70 and primary compressed air chambers 72 and 74. The compressed air which is forced out of the manifold 70 is forced out through these air jet nozzles 86, which forces the regulated compressed air down onto strategic points of the labels. The downward release of the regulated compressed air blows the labels 12 down onto the product unit to be labeled in a single blast action and precisely places the label on the product unit as it is moving rapidly past the printer applicator 38. The entire process described can and is repeated 60 to 120 times a minute depending on the product size, weigh and labeling accuracy requirements. FIG. 9 illustrates a flow chart of steps involved.

The air jet nozzles 86 can be plugged, and the air jet nozzles 86 can be screwed into position in a variety of positions in order to precisely direct the compressed regulated air as it escaped from the manifold 70, thus increasing the accuracy of the label 12 movement from the applicator plate 60 through mid air and onto the product unit 14. The entire manifold 70 is mounted inside of the applicator housing 68, which is secured by two hex bolts 88 and 90 (not shown), which screw into the side of the manifold 70 from the outside of the applicator housing 68. The two hex screws 88 and 90 also act as adjustments for the manifold's 70 position relative to the applicator plate 60, which allows for further label dispensing accuracy settings.

The applicator plate 60 and use of the air valves 76 allows extremely precise application of labels with an accuracy of plus or minus ⅛ inch precision from distances as far away as 18 inches.

Turning to FIG. 2 of the drawings, label roll 90 contains a roll of either blank or preprinted labels 12. Roll 90 may contain up to 5,000 labels based on 2 inch tall labels. From roll 90, labels 12 extend continuously onto guide roller 92 and into printhead mechanism 32. Printhead mechanism 32 intermittently is applied by means of electronic control onto print labels 12, so as to print the desired alpha-numeric, or graphic indicia on each label 12. The continuous roll of labels is then directed backward along the bottom 96 of applicator housing 68. Each individual label is directed from the backing 98 of labels 12 onto the applicator plate 60 as described above. The individual label 12 is then directed downwardly by the blast of compressed air when the product unit 14 is below the applicator plate 60.

As mentioned above, labels 12 come in preprinted or blank rolls one inch to 6½ inches in width. The rolls may be up to 12 inches maximum diameter on a 3 inch core. Character height of the printing may be from 0.07 inches and 6 standard alpha-numeric fonts are available in a preferred embodiment. Bar code density is a minimum bar width of 0.010 inch, with print width being from 2 to 6.2 inches. Print speed is 3.5 inches per second.

In a preferred embodiment, the device 10 utilizes a thermal printer 32. Specially treated labels, as known in the art, are susceptible to thermal imprint. Thus by electrostatically applying the desired pattern using either UPC, Interleaved 2 of 5, Code 39, EAN, or Codebar technology Symbologies, a wide range of character fonts and fast print speeds may be accomplished.

The previously mentioned control console 42 preferably has 40 characters and a liquid crystal display 100. The key pad has 48 keys contained within a polycarbonate overlay with four additional user definable function keys and four standard printer control keys. In addition a 6 inch by ⅜ inch overlay window may be provided for operator instruction menus.

In a preferred embodiment, microprocessor 28 has a non-volatile memory of 16K and interfaces utilizing standard RS-232-C ports with preferred configuration being TX Data, RX Data, and Signal Ground.

The software required to convert the data from the check weigher 26 to alpha-numeric or bar code labeling on printer 32 is attached in the form of micro fiche, and is incorporated herein.

Referring now to FIG. 5, the computer board 54 incorporates microprocessing unit 100 for executing instructions stored in EPROM 52. The microprocessing unit used in the preferred embodiment is type Z80-A manufactured by Zilog Corporation. The address, control, and data signals generated by the microprocessing unit are buffered by signal buffers 102 and 104, and bi-directional buffers 106, respectively. The outputs of the buffers are designated as address bus 108, control bus 110, and data bus 112. The three buses interface the microprocessing unit to memory and input/output (I/O) located on computer board 54 and located on other boards within microprocessor 28. Resident on the computer board are the EPROM program store 52 of maximum capacity of 32,768 bytes, EPROM non-volatile data store 114 having a maximum capacity of 16,384 bytes and read-write RAM memory 116 of 2,048 byte capacity. Also present on the computer board is serial communications interface 118 that is capable of servicing two RS232C serial ports 30 and 120, identified as COM1 and COM2, respectively. In the preferred embodiment, COM1 is utilized to communicate with check weigher 26 while COM2 is available for communications with other equipment or with a separate operator console 42. Programmable timer 122 provides serial bit timing clocks for serial interface 118 and a periodic interrupt signal to microprocessing unit 100 via interrupt line 124. Input/output device selection signals for serial interface 118 and timer 122 are generated by local I/O decoder 126. An additional output of decoder 126 activates system I/O decoder 128. The system I/O decoder outputs sixteen unique I/O enables that are distributed to other boards within microprocessor 28. These sixteen lines are identified collectively as the I/O enable bus, 130, and individually as IO-1 through IO-16. Operation of the computer board is coordinated by clock signals generated by oscillator 132. Instructions are provided within EPROM 52 to receive data relative to each product unit, convert the data to printable indicia and control various peripheral devices to effect the printing of labels and to coordinate movements of labels and product units.

Turning to FIG. 6 of the drawings, system buses 108, 110, 112, and 130 are routed from the computer board 54 to control board 58 and digital I/O board 134. The control board contains the electronics necessary to interface the printer mechanism 32 and photovoltaic cells 36 to the computer board 54. The digital I/O board connects the display module 46 to the system buses and interfaces the operator keypads 44 and air valves 76 to the computer board. The control board 58 has two registers that allow operation of the printer mechanism 32 by software program. The printer data shift register 136 receives data bytes from data bus 112 when strobed by I/O enable signal IO-12. The shift register transmits the data to printhead 36 bitsequentially. The data so transmitted may represent human readable or machine readable indicia. Printhead and motor commands are loaded into control latch 138 from the data bus by I/O enable signal IO-11. After the dot pattern for an entire print line has been sent to the printhead via shift register 136, a print command is issued to the printhead and a motor step command is issued to the stepping motor interface 140. The stepping motor interface sequences currents through the windings of stepping motor 142 thereby causing the label 12 to advance through the print mechanism and resulting in the presentation of the next line in sequence to the printhead. When printing operations are completed, motor step commands are issued to bring the next label into the printhead.

Buffer 144 on the control board 58 allows the microprocessing unit 100 to monitor the position of labels within the print mechanism 32 and the position of product units 14*a*, 14*b*, and 14*c* on the conveyor mechanism 16. Inter-label gaps are detected by photovoltaic cell 146 and operational amplifier 148. The presence of a gap is latched in inter-label gap detect flip-flop 150. The flip-flop is cleared by I/O enable signal IO-13. The presence of a product unit at the check weigher is detected by scale photocell 152 while the presence of a product unit at applicator 38 is detected by photocell 154. These signals are read by the microprocessing unit 100 when I/O enable signal IO-14 is activated. The speed of product units may be readily determined by the microprocessing unit by measuring the delay between the appearance of a unit at photocell 152 and its subsequent appearance at photocell 154. By maintaining a count of the number of product units between photocells 152 and 154, the microprocessing unit can coordinate the printing and movement of labels with the movement of product units so as to ensure the application of labels to their corresponding product units.

The digital I/O board 134 interfaces the microprocessing unit 100 to the operator keypads 44 and air control valves 76 and provides connections to the display module 46. Keypad row latch 156, loaded by IO enable IO-3, drives the row inputs of keypads. The column outputs of the keypads are read via column buffers 158 and 160 by activating I/O enables IO-4 and IO-5, respectively. The display module 46 is enabled onto the data bus by the logical OR combination of IO-1 and IO-2. Digital output port 162 is clocked by I/O enables IO-9 and IO-10 to drive the input diode of triac-output optocoupler 164. It also provides 15 uncommitted output lines. The triac is connected in series with the AC line voltage source 166 and air control valves 76 such that when the optocoupler is driven by port 162, the label 12 is blown off of applicator plate 60 onto the product unit. Buffers 168 and 170, enabled by IO enables IO-15 and IO-16, allow the microprocessing unit to query the settings of eight pole option switch 172 and eight pole baud rate select switch 174. Buffer 176, enabled by IO-6 and IO-7, provides sixteen uncommitted input lines. The uncommitted inputs of buffer 176 and the uncommitted outputs of output port 162 may be utilized to implement optional features. These features may include control of electric motor 24 to regulate the speed of conveyer mechanism 16, thereby coordinating the movement of product units with the movement of their respective labels and the monitoring of photocells in conjunction with control of hydraulic or electric jacks 48 and 50 to determine the size or product number of a product unit.

In FIG. 7 a pair of printers 32 and label applicators 38 are configured with two microprocessors 28 to form two printer and applicator stations, 200 and 202. The microprocessors are used without their respective keypads 44 and display modules 46. The stations are controlled by a common operator console 204 via RS232C serial communications interfaces 206 and 208. The common operator console is comprised of a computer board 54 with digital I/O board 134, keypads 44, and display module 46. The RS232C interface 30 from check weigher 26 is connected to both stations. Labels may be printed and applied two at a time with this configuration thus doubling the line speed.

Other multiple station configurations are possible. In FIG. 8, station 200 is equipped with a keypad 44 and a display 46 and it performs printing and the operator interface functions of operator console 204 of FIG. 7. Station 200 controls station 202 via RS232C communications while both stations receive product unit information from check weigher 26 via serial link 30.

The foregoing merely explains and illustrates the invention and the invention is not limited thereto except insofar as those who have the disclosure before them are able to make modifications and variations therein without departing from the scope of the invention.

I claim as my invention:

1. A method of continuously printing and applying individual labels having visible indicia thereon unique to each product unit:
determining data relevant to said product unit;
communicating said data to a printer;
translating said data into commands for printing a label;
dispensing a plurality of individual labels;
printing visible indicia on each of said labels corresponding to said data for each of said product units;
coordinating movement of said labels relative to said product units so that each label is aligned with its corresponding product unit;
applying each of said labels to its corresponding product unit;
wherein said step of determining data comprises: reading a bar code on said product unit.

2. A method of continuously printing and applying individual labels having visible indicia thereon unique to each product unit:
determining data relevant to said product unit;
communicating said data to a printer;
translating said data into commands for printing a label;
dispensing a plurality of individual labels;
printing visible indicia on each of said labels corresponding to said data for each of said product units;
coordinating movement of said labels relative to said product units so that each label is aligned with its corresponding product unit;
applying each of said labels to its corresponding product unit;
wherein said step of determining data comprises: measuring the size of said product unit.

* * * * *

UNITED STATES PATENT AND TRADEMARK OFFICE
CERTIFICATE OF CORRECTION

PATENT NO. : 5,425,823

DATED : June 20, 1995

INVENTOR(S) : James Woodside, III

It is certified that error appears in the above-indentified patent and that said Letters Patent is hereby corrected as shown below:

Column 6, line 17, "bitsequentially" should be --bit-sequentially--

Signed and Sealed this

Sixteenth Day of January, 1996

Attest:

BRUCE LEHMAN

*Attesting Officer*

*Commissioner of Patents and Trademarks*